Dec. 25, 1962   C. J. CASALEGGI   3,070,232
FILTER UNIT WITH SIGNAL DEVICE
Filed Oct. 1, 1959

CHARLES J. CASALEGGI
INVENTOR.

BY Lawrence J. Winter
ATTORNEY

United States Patent Office 3,070,232
Patented Dec. 25, 1962

3,070,232
FILTER UNIT WITH SIGNAL DEVICE
Charles J. Casaleggi, Middletown, N.J., assignor to Purolator Products, Inc., Rahway, N.J., a corporation of Delaware
Filed Oct. 1, 1959, Ser. No. 843,864
7 Claims. (Cl. 210—90)

The present invention relates to a filter unit, and more particularly to a filter unit having a signal device to indicate when the filter has become clogged.

In a filter system using a hydraulic operating fluid, it is essential that the fluid may be carefully filtered to the finest degree possible to avoid mechanical failure of the mechanism the fluid serves by reason of the presence of solid impurities. For example, in aircraft systems, such as aircraft landing gear systems, aircraft cowl flap systems, and other aero-dynamic systems the passage of solid impurities through the system with the fluid may be of such a critical nature as to cause failure of the aircraft operation due to the filter unit not performing its essential function. Hence, it is necessary that the filter unit be cleaned or changed before the critical period is reached. Such period occurs when the filter unit either becomes clogged so that no fluid will pass therethrough, or the filter unit permits solid impurities carried in the fluid to pass through the by-pass or relief valve in the system.

It is an object of the present invention to provide a filter unit having magnetic signal means incorporated therein to enable the operator to know when the filter unit must be cleaned or replaced to maintain the finest degree of filtration possible, in order to avoid mechanical failures in the mechanism which the fluid operates.

Another object of the present invention is to provide magnetic actuating means for the signal device which is incorporated in the filter cartridge or element and is an integral part thereof.

Another object of the present invention is to provide a signal device for a filter unit to indicate when the filter needs cleaning disposed externally of the filter casing and magnetic actuating means disposed internally of the casing with no openings through the casing between these parts of the device thereby eliminating the need for a seal therebetween and a point of possible leakage in the unit.

Another object of the present invention is to provide a signal device for a filter element having locking means disposed internally of the filter casing for the signal device actuating means so that once the signal device has been released by the actuating means to a position indicating that the filter cartridge has become clogged and needs servicing, the actuating means can only be reset manually by dismantling the filter casing and removing the filter element. Hence, this insures proper cleaning of the filter element since it must be removed to make the signal device operative again.

Another object of the present invention is to provide a signal device provided with locking means preventing it from being released to a position indicating the filter element is clogged, without being released manually. Thus, the present invention provides a signal device in which an operator must actually release the locking means to determine that the filter cartridge is really clogged and has not been inadvertently set off due to an increase in gravity or a shock load on the unit.

Another object of the present invention is to provide magnetic reciprocating piston means for actuating the signal device to indicate the filter has become clogged.

Another object of the present invention is to provide a signal device for indicating when the filter element has become clogged with the signal device actuating means operatively disposed entirely within a closed filter casing having no breaks or openings in it communicating with the atmosphere thereby eliminating any sealing problems or points of leakage in the system and further providing a signal device responsive to the true differential pressure across the filter element that is not affected in any way by variations in external atmospheric pressure.

Various other objects and advantages of the present invention will be understood from the following description when considered in connection with the accompanying drawings forming a part thereof and in which—

Figure 1:
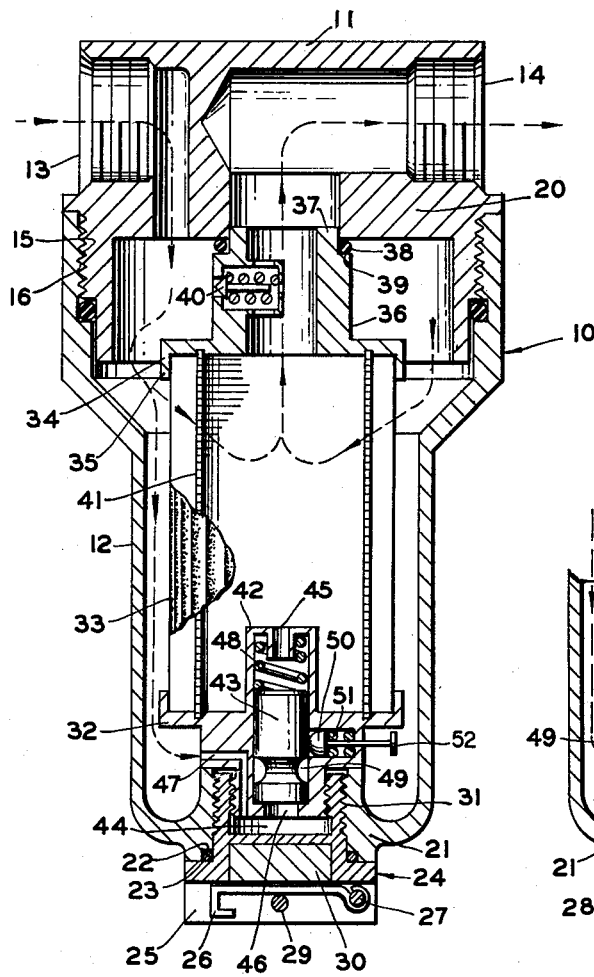
FIG. 1 is a sectional view of the filter unit of the present invention with certain parts broken away illustrating the position of the actuating means and signal device when the filter element is clean.

Referring to the drawings, the reference numeral 10 generally designates an oil filter unit or assembly comprising a hollow cylindrical head 11 and a cylindrical casing 12 preferably made of stainless steel or other non-magnetic material. The filter head has threaded inlet and outlet openings 13 and 14 for passing liquid to be filtered through the unit. The lower portion of the head is provided with external threads 15 which mate with internal threads 16 on casing 12 to provide a fluid tight connection. A central tube or member 20 extends downwardly in the head and partitions off the inlet and outlet openings from each other.

The lower end of the cylindrical casing 12 is provided with a central opening therein formed by an integral tubular boss 21 extending above and below the casing proper as best seen in FIG. 1. The lower end of boss 21 is provided with an annular shoulder or recess 22 on its inner surface on which is disposed a braze ring 23. A hollow tubular plug member 24 having threads 31 is threaded into boss 21 and is permanently secured thereto by brazing the ring 23 to form a brazed fluid tight joint. Plug 24 is provided with a slot 25 (FIG. 4) extending therethrough in which is disposed a ferrous indicator rod 26 pivotally connected at 27 to the plug and normally held against plug head 28 by a removable pin 29 positioned in oppositely disposed holes in the plug. A soft iron slug 30 is countersunk in the plug head 28 flush with the surface of the head 28 and disposed in contact with indicator rod 26 in a non-signalling position. The upper end of hollow plug 24 is provided with internal threads.

The filter element disposed in casing 12 comprises a cylindrical convoluted wire or woven cloth member 33 having a lower end cap 32 and upper end cap 34. The end caps are provided with rims 35 to which the woven cloth member 33 is secured by brazing, silver-soldering or the like. Upper end cap 34 has a tubular neck 36 with a reduced or necked-in portion 37 which extends into tubular member 20. An O-ring 38 is disposed on the shoulder 39 formed by the reduced portion to provide a seal when the filter element is properly disposed in the casing. A spring loaded by-pass or relief valve 40 is disposed in neck 36. A metal edge type filter element 41 such as that disclosed in Patent 2,622,738 granted December 23, 1952, to Kovacs, is disposed within wire cloth member 33. The metal edge filter element serves to reinforce the filter element in place of a center tube and has its ends secured to the end caps also by brazing, silver-soldering or the like.

The lower end cap 32 is received by the internal threads of plug 24 and is provided with a centrally disposed vertical cylinder 42 formed therein in which is positioned a reciprocating magnet piston 43. The end cap is threadably disposed in plug 24 to seat against the upper end of boss 21. A liquid inlet chamber 44 is provided between the lower end of the end cap and plug 24. The opposite ends of cylinder 42 are provided with liquid inlet ports or openings 45 and 46 respectively. A small horizontal and vertically extending passage 47 is provided in one side of end cap 32 in communication with the upstream side of the filter element at one end, and in communication with inlet chamber 44 at the opposite end to permit the liquid pressure on the upstream side of the filter element to act against the lower end of piston 43. Port 45 permits the liquid pressure on the downstream side of the filter element to act against the opposite end of piston 43. A compression spring 48 is disposed in the upper end of cylinder 42 and maintains the piston disposed adjacent the lower end of the cylinder during normal operation of the filter.

A circumferential recess or groove 49 is provided in the lower side wall of piston 43 so that when the piston moves upwardly to its uppermost position in the cylinder due to the pressure differential across the filter element exceeding the force in compression spring 48, a hemispherical member 50 maintained by a compression spring 51 in contact with the side piston 43 seats in groove 49 and locks the piston in this position. A lever or handle 52 is provided for member 50 so that the locking member may be withdrawn from the piston groove when the filter unit is dismantled and the element removed and cleaned. This allows spring member 48 to return the piston to its normal position seated adjacent the lower end of the cylinder.

In operation the magnetic piston 43 is normally maintained in the lower end of the cylinder 42 by the force of spring 48, and oil pressure acts on both ends of the piston through ports 45 and 46. At this time the magnetic force in piston 43 permeates the soft iron slug 30 and holds the indicator rod 26 by magnetic attraction or force against the bottom of the plug 24 thereby indicating that the filter element is operating properly and does not require cleaning. At this time pin 29 is disposed in the holes in plug 24 and will not permit the indicator rod 26 to fall away from the plug even if piston 43 released the rod.

Figure 2:
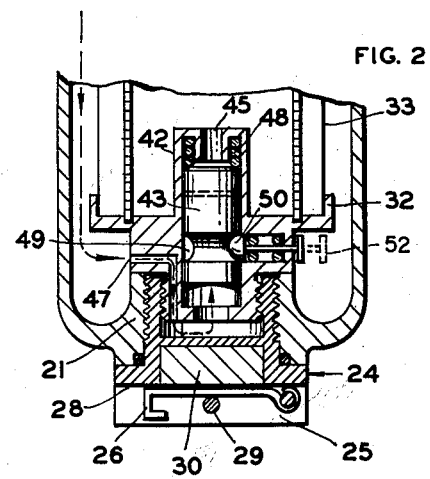
FIG. 2 is a fragmentary sectional view of the filter unit when the filter cartridge needs cleaning.
Figure 3:
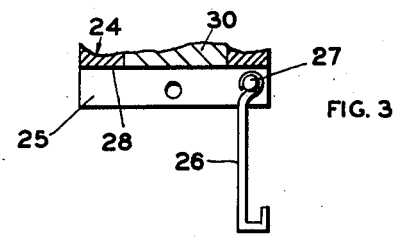
FIG. 3 is a detail side view showing the indicator rod of the signal device in its released or signal position after the locking means have been manually moved.

When the differential pressure across the upstream and downstream sides of the filter element increases above the predetermined force of spring 48 maintaining piston 43 in the lower end of the cylinder due to the filter becoming clogged on the upstream side, this increase in differential pressure is transmitted through passage 47 and inlet chamber 44 against the lower end of the piston and through port 45 against the upper end of the piston, thereby forcing the piston to move upwardly in the cylinder. When the piston moves to the position shown in FIG. 2 spring 51 forces locking device 50 into piston groove 49 and locks the piston into a position where the magnetic force therein is not sufficient to hold the indicator rod 26 in a non-signalling position so that member 26 will fall into the position illustrated in FIG. 4 when pin 29 is removed from the plug as shown. The pin prevents the indicator rod from giving a false signal when the magnetic piston has been temporarily jolted away from the indicator rod by shock impact such as occurs when unusual gravitational forces act upon the unit, e.g. as when an aircraft is landing. After the shock load upon the piston passes the piston is returned to its normal position in the lower end of the cylinder and the rod is again magnetically attracted to hold the indicator rod thereagainst.

Once the actuating piston has been moved upwardly in the cylinder by a pressure differential across the filter element truly indicating a clogged filter, it cannot be made operative again unless the filter casing is dismantled and the filter element removed from the casing since the locking device is located internally of the casing.

Figure 4:
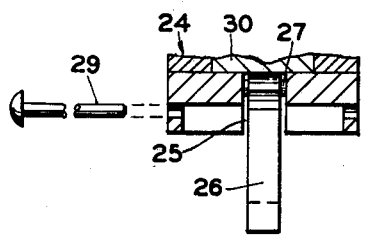
FIG. 4 is an end view of the indicator rod of FIG. 3.

When it is desired to determine if the filter element is actually clogged and needs cleaning, it is only necessary that the operator remove the pin 29 from the plug and immediately upon doing so the indicator rod 26 will fall into the position shown in FIG. 4 if the filter element is dirty.

It is apparent that the present invention provides a signal device for indicating when a filter element needs cleaning which has many advantages including a magnetic reciprocating piston actuating mechanism formed integrally in the filter end cap, a safety locking device which makes the signal device inoperative after it is set off unless the filter element is removed, and additional locking means for the indicator rod so that it will not falsely indicate the filter needs cleaning when a shock impact has momentarily release the indicator rod.

Inasmuch as various chanegs may be made in the form, location and relative arrangement of the several parts without departing from the essential characteristics of the invention, it will be understood that the invention is not to be limited by the scope of the appended claims.

What is claimed is:

1. A filter unit comprising a head and a casing, said head having an inlet and outlet, a signal device disposed externally of said casing, signal device connecting means attached to the bottom of said casing and pivotally attaching the signal device to said casing, a filter element in said casing between said inlet and outlet, an end cap in the bottom of said casing adjacent said signal device secured to the filter element, a vertical cylinder formed integral with said end cap, a magnetic reciprocating piston disposed in said cylinder to magnetically hold said signal device in a non-signalling position, biasing means normally maintaining said piston in the lower end of said cylinder, passage means communicating the lower side of said piston with said inlet and the upper side of said piston with said outlet, said piston being responsive to the differential pressure across said end cap to actuate the signal device to a signal position when the differential pressure across the piston exceeds a predetermined value, signal device release means attached to said connecting means to prevent movement of said signal device to a signal position until manual release of said release means, said piston having a circumferential groove therein, and piston locking means disposed in said end cap adapted to lock in said groove when said piston is actuated by a predetermined differential pressure exceeding said predetermined value, thereby requiring removal of the end cap from the casing to return said signal device to a non-signalling position.

2. The filter unit of claim 1 wherein said signal device comprises a horizontally disposed rod having one end pivotally attached to said connecting means, and said signal device release means comprises a horizontally disposed bar removably attached to said connecting means and disposed transversely of said rod and adjacent the lower side of said rod.

3. A filter unit comprising a head and a casing, said head having an inlet and outlet for passing liquid to be filtered, a filter element in said casing between said inlet and outlet, a threaded end cap secured to the filter element, said end cap having an externally threaded portion forming a vertical cylinder therein, a tubular boss in the bottom of said casing, a plug member threaded in said boss adapted to receive said threaded end cap therein, a magnetic reciprocating piston in said cylinder, biasing means normally maintaining the piston adjacent the bottom of the cylinder, a ferrous signal device disposed externally of said plug member and pivotally connected thereto adjacent the bottom of said cylinder and normally held in a non-signalling position by said piston, passage means communicating the opposite sides of said piston and cylinder with opposite sides of said end cap and said inlet and outlet whereby the signal device is actuated when the differential pressure across said end cap exceeds a predetermined value, signal device release means attached to the plug member to prevent movement of said signal device to a signal position until manual release of the release means, said piston having a circumferential groove therein, and piston locking means disposed in said end cap adapted to lock in said groove when said piston is actuated by a predetermined differential pressure exceeding said predetermined value, thereby requiring removal of the end cap to return said signal device to a non-signalling position.

4. The filter unit of claim 3 wherein said signal device comprises a horizontally disposed rod pivotally connected at one end to said plug member, and said signal device release means comprises a horizontally disposed pin member removably attached to said plug member and disposed transversely to said rod adjacent the lower side thereof.

5. A filter unit comprising a head and a casing, said head having an inlet and outlet, signal device connecting means attached to the bottom of said casing, a signal device comprising a horizontally disposed bar member having one end pivotally attached to said connecting means, signal device release means including a horizontally disposed pin member detachably connected to said connecting means and disposed transversely to said bar member and adjacent the underside thereof and supporting said bar member thereon to normally maintain said signal device in a non-signalling position, a filter element disposed between said inlet and outlet, an end cap in said casing adjacent said signal device secured to said filter element, a vertical cylinder formed integral with said end cap, a magnetic reciprocating piston disposed in said cylinder, biasing means normally maintaining said piston in the lower end of said cylinder adjacent said signal device, passage means in communication with said inlet and said outlet and in communication with the opposite sides of said piston, said magnetic reciprocating piston normally holding said signal device in a non-signalling position and responsive to the differential pressure across said piston to actuate the signal device to a signal position when the differential pressure across said piston exceeds a predetermined value.

6. A filter unit comprising a head and a casing, said head having an inlet and outlet for passing liquid to be filtered, a filter element in said casing between said inlet and outlet, a threaded end cap secured to said filter element, said end cap being disposed adjacent the bottom of said casing and having an externally threaded portion forming a vertical cylinder therein, a tubular boss in the bottom of said casing, a plug member threaded in said boss adapted to receive said threaded end cap, a magnetic reciprocating piston in said cylinder, biasing means normally maintaining the piston adjacent the bottom of the cylinder, a ferrous signal device disposed externally of said plug member and pivotally connected thereto adjacent the bottom of said cylinder and normally held in a non-signalling position by said piston, passage means communicating the opposite sides of said piston and cylinder with opposite sides of said end cap and said inlet and outlet, signal device release means including a pin member removably attached to said plug member and disposed below said ferrous signal device and supporting said ferrous signal device to prevent movement of said signal device downwardly from the bottom of the casing until said pin member is detached from said plug member.

7. The filter unit of claim 6 wherein said ferrous signal device comprises a horizontally disposed rod member, pivotally connected at one end to the bottom of said plug member, and said pin member is disposed transversely of said rod member, and said pin member and rod member are disposed in a slot extending through said plug member.

References Cited in the file of this patent
UNITED STATES PATENTS

| | | |
|---|---|---|
| 2,400,200 | Katcher | May 14, 1946 |
| 2,563,786 | James | Aug. 7, 1951 |
| 2,669,707 | Ehrman | Feb. 16, 1954 |
| 2,878,936 | Scavuzzo et al. | Mar. 24, 1959 |
| 2,879,892 | Frakes | Mar. 31, 1959 |